United States Patent

Krishna

[11] Patent Number: 6,138,111
[45] Date of Patent: *Oct. 24, 2000

[54] CARDINALITY-BASED JOIN ORDERING

[75] Inventor: Murali M. Krishna, Hillsboro, Oreg.

[73] Assignee: Informix Software, Inc., Menlo Park, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/850,246

[22] Filed: May 2, 1997

[51] Int. Cl.$^7$ ........................................... G06F 17/30
[52] U.S. Cl. ........................................................ 707/2
[58] Field of Search ............................................ 707/2

[56] References Cited

U.S. PATENT DOCUMENTS

| | | | |
|---|---|---|---|
| 5,345,585 | 9/1994 | Iyer et al. | 707/2 |
| 5,379,419 | 1/1995 | Heffernan et al. | 707/1 |
| 5,412,804 | 5/1995 | Krishna | 707/2 |
| 5,469,568 | 11/1995 | Schiefer et al. | 707/2 |
| 5,542,073 | 7/1996 | Schiefer et al. | 707/2 |
| 5,598,559 | 1/1997 | Chaudhuri | 707/2 |
| 5,664,171 | 9/1997 | Agrawal et al. | 707/2 |
| 5,671,403 | 9/1997 | Shekita et al. | 707/3 |
| 5,758,335 | 5/1998 | Gray | 707/2 |

OTHER PUBLICATIONS

Astrahan et al., "Access Path Selection in a Relational Database Management System", IBM Technical Disclosure Bulletin, vol.22, No.4, Sep. 1979, 1657–1660.

Graefe et al., "The Volcano Optimizer Generator: Extensibility and Efficient Search", IEEE, 1993, 209–218.

Haas et al., "Extensible Query Processing in Starburst", Sigmod Record, vol. 18, No. 1, Mar. 1989, 377–388.

*Primary Examiner*—Maria N. Vonbuhr
*Attorney, Agent, or Firm*—Fish & Richardson P.C.

[57] ABSTRACT

Method and apparatus for optimizing the processing of join queries based on join cardinality. Embodiments implement the methods in query optimizers in relational database management systems. A good join order for a multiple join query is found with a metric that compares the relative merits of candidate join orders as a whole. Embodiments estimate the join selectivity of foreign key—foreign key joins, where both participating tables are foreign keys with respect to a primary or unique key of one primary table. A graph representation of a query is processed to estimate the join cardinality of an arbitrarily large number of filters and joins, including any combination of primary key—foreign key joins and foreign key—foreign key joins.

30 Claims, 4 Drawing Sheets

CARDINALITY-BASED JOIN ORDERING

BACKGROUND

The invention relates to query optimization in database systems, and more particularly, to join order optimization in relational database systems.

A database is a collection of information. A relational database is a database that is perceived by its users as a collection of tables. Each table arranges items and attributes of the items in rows and columns respectively. Each table row corresponds to an item (also referred to as a record or tuple), and each table column corresponds to an attribute of the item (referred to as a field or more correctly, as an attribute type or field type). The cardinality of a table T is the number of records it contains, and is denoted |T|.

A "primary key" for a table is a simple or composite attribute that uniquely identifies records of the table. The key must be inherently unique, and not merely unique at a particular point in time. It is possible, but not typical, to have a table where the only unique identifier is the composite attribute consisting of all the attributes of the table. It is also possible, but not typical, for a table to have more than one unique identifier. In such a case, the table may be said to have multiple candidate keys, one of which could be chosen and designated as the primary key; the remaining candidates then would be said to be alternate keys. Primary and alternate keys must satisfy two time-independent properties. First, at no time may two records of the table have the same value for the key. Second, if the key is composite, then no component of the key can be eliminated without destroying the uniqueness property.

A "foreign key" is a possibly composite attribute of a table whose values are required to match those of the primary key of some table, which is typically but not necessarily distinct from the table for which the foreign key is defined. A foreign key value represents a reference to the record containing the matching primary key value, which may be called the referenced record or the target record. The table that contains the foreign key may be referred to as the referencing or foreign table and the table that contains the corresponding primary key, as the referenced or target or primary table.

Searching the data in a relational database is done by means of a query. A query contains one or more predicates which specify the information which the query should retrieve from the database. A join query is a query which requests information from more than one table. For example, in a database which stores telephone directory information in one table and employment information in another table, a join query might request the names of all people who live and work in the same city.

A join query must contain at least one "join predicate" which specifies the criteria which are used to select records from the two tables. A join query may also include one or more single-table predicates to select records from the individual tables (e.g., employees whose home phone numbers are in the 876 exchange). The join selectivity of a join query is the ratio of the number of matches which result from the join (i.e. the join cardinality) to the product of the cardinalities of the joined tables.

A primary key of a table P is denoted P.Pk. A foreign key of a table S with respect to some primary key is denoted S.Fk. A primary key—foreign key join is denoted a Pk-Fk join. A join of two keys which are both foreign keys with respect to the same primary key is denoted an Fk-Fk join.

A naive way of performing a join query is to examine every record in the second table for each record in the first table in order to determine whether any records satisfy the join predicate. Such records may be said to match. The database system may then construct an intermediate (or final) result containing the matching records joined together.

Performing multiple join queries on large databases can be time consuming and resource intensive. One way to make a join query with multiple joins more efficient is by optimizing the order in which tables are joined. A good join order can reduce the number of comparisons made or the size of intermediate results, thereby decreasing the resources expended and the total time necessary to perform the entire query. Obtaining a good join order, however, is generally difficult. Conventional join order optimizers rely heavily on estimates of the cardinalities of intermediate results. Estimating these cardinalities is also generally difficult. The methods conventionally used are approximate at best and can be fairly inaccurate in some cases. A more efficient and accurate method for estimating optimal join ordering is therefore desirable.

SUMMARY OF THE INVENTION

In one aspect, the invention is directed to a computer-implemented method for calculating a good join order in a multiple join query through the implementation of a metric designed to compare the relative efficiencies of alternative join orders.

In another aspect, the invention is directed to a computer-implemented method for estimating the join selectivity of an Fk-Fk join, that is, a join with the join predicate substantially of the form R.r=S.s, where both R.r and S.s are foreign keys with respect to one primary or alternate key of one primary table.

In another aspect, the invention is directed to a computer-implemented method for efficiently estimating the join cardinality of an arbitrarily large number of multiple joins, including any combination of Pk-Fk joins and Fk-Fk joins.

Among the advantages of the invention is that the speed and efficiency of join query performance is improved. Additional advantages of the invention will be set forth in the description which follows, and will become apparent from the description and from the claims.

DETAILED DESCRIPTION

The present invention provides methods and apparatus for optimizing join order processing in relational database systems.

Figure 1:
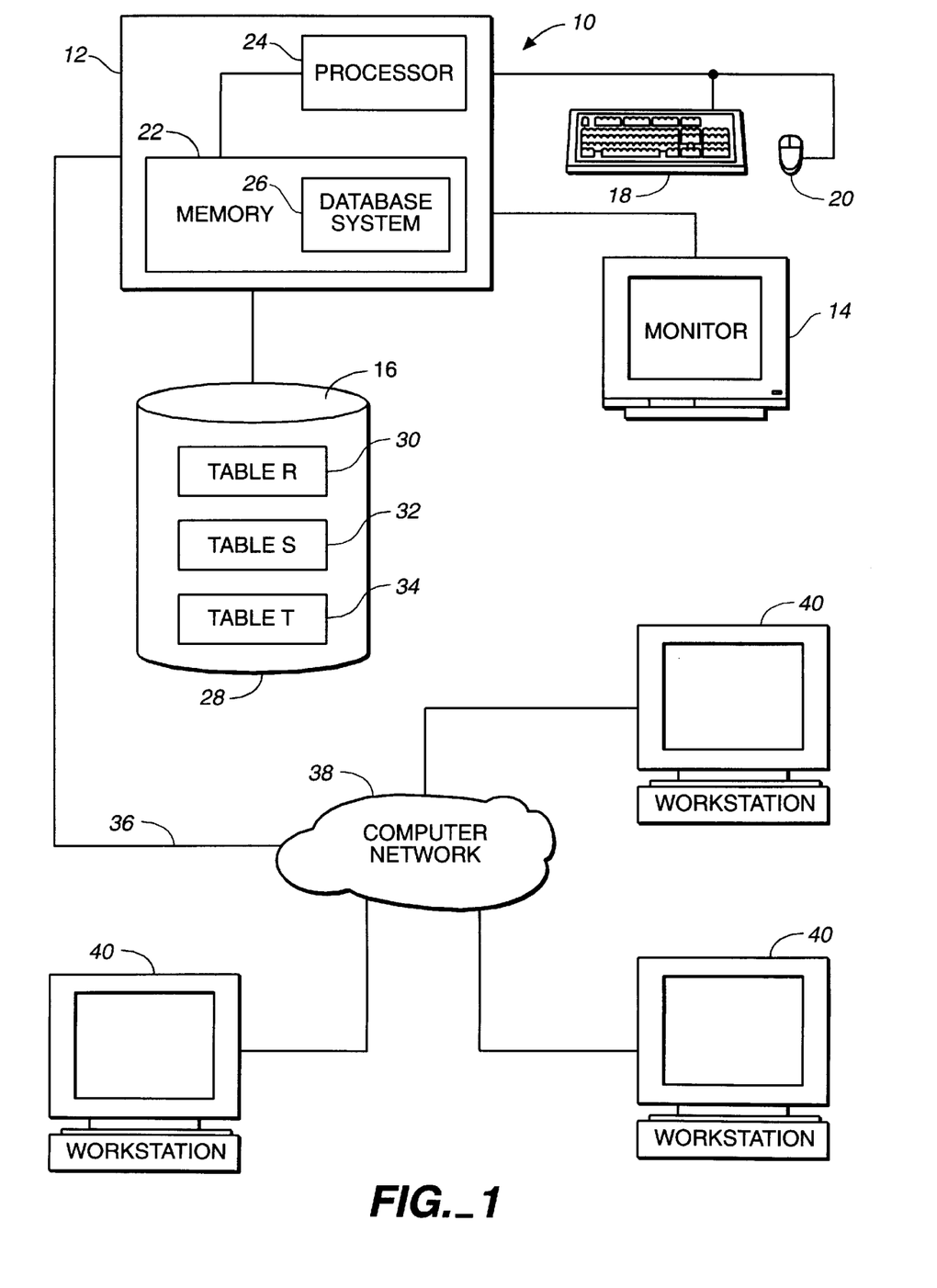
FIG. 1 is a block diagram of a general purpose computer platform programmable in accordance with the invention and including a relational database.

FIG. 1 shows a general purpose computer platform 10 suitable for supporting a relational database system 26 embodying cardinality-based join optimization in accordance with the invention. The platform includes a digital computer 12 (such as a personal computer or a workstation), a display 14, a mass storage device 16 (such as a floppy disk drive, a hard disk drive, an erasable CD-ROM drive, or a magneto-optical disk drive), a keyboard 18, and a mouse 20 or other input device. The computer 12 is of conventional construction and includes a memory 22, a processor 24, and other customary components, such as a memory bus and peripheral bus (not shown). The computer 12 also includes communications hardware and software (not shown) by which the computer 12 may be connected over a computer network 38 to other computers 40 over a communications link 36.

The database system 26 manages a database. The database 28 may be centralized on a single computer, or it may be distributed across the computer network 38. Typically, the database 28 will be managed by a database system 26 running on a computer linked to the database, either permanently or transiently. In this illustration, the database management system is shown as running on the computer 12.

As stated earlier, one of the issues in design and implementation of relational database systems is join optimization, i.e., calculating an optimal order in which to join tables in a multiple join query. Although the order in which tables are joined will not affect the result of the join, different join orders for the same query can consume different amounts of time and other resources.

Consider a relational database containing tables R, S, and T, a join query in which tables R, S, and T are to be joined, and two possible join orders: (1) join tables R and S, and then join the result with table T, and (2) join tables S and T, and then join the result with table R. Consider join order (1) first. If |(R join S)|=20 and |((R join S) join T)|=60, then the total number of tuples created during the calculation of the total query is 80 (20+60). Next consider join order (2). If |(S join T)|=500 and |((S join T) join R)|=60, then the total number of records created during the calculation of the total join is 560 (500+60). The choice of join order can be significant, particularly with multiple joins involving large tables.

A new metric, Sigma, is used to pick a join order from among possible join orders in a multiple join query. Sigma is defined as the sum of the number of tuples estimated to result from each join as it is performed in a join order. Using the Sigma metric, the join order having the smallest Sigma among all join orders is selected as optimal and used to perform the join. Ties among competing join orders may be broken using some other heuristic, which may be based, for example, on further cost estimate calculations. In the example given above, Sigma for join order (1) is 80 and Sigma for join order (2) is 560, indicating that order (1) is preferred over order (2).

Figure 2:
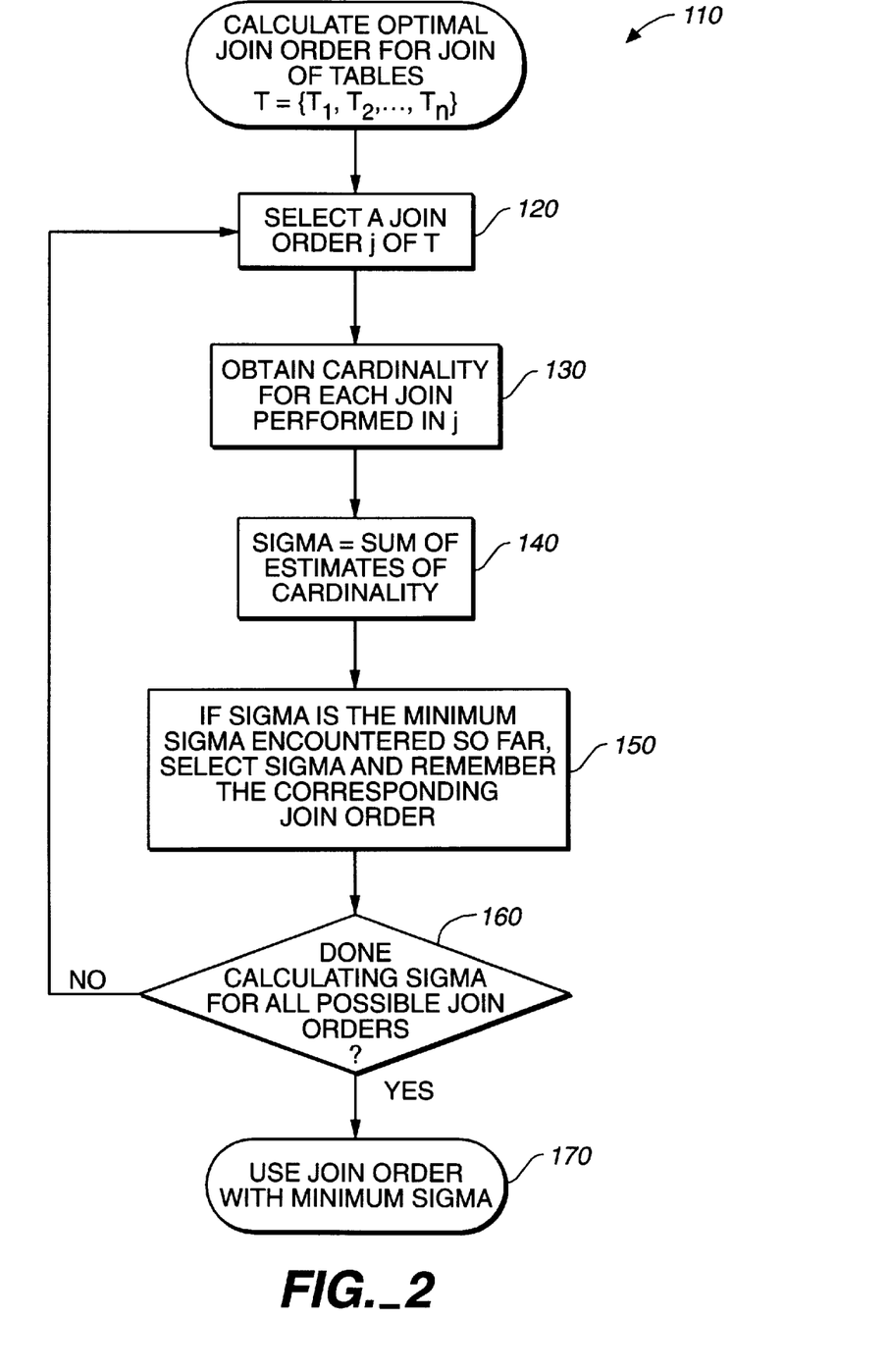
FIG. 2 is a block diagram of a computer-implemented method for calculating an optimal join order for a given set of tables in a join query in a relational database system.

FIG. 2 shows a computer-implemented process 110 which uses the Sigma metric to pick a join order from among possible join orders for a join query involving tables T={T1, T2, T3, . . . Tn}. First, a join order is selected from among the possible join orders (step 120). Next, the cardinality of each component join in the join order is obtained (step 130). This can be done by estimating the cardinality using the graph representation method described below, by retrieving a pre-computed value, or by some other method. It is not necessary for the calculation of Sigma that these cardinalities be calculated using any particular method. A value for Sigma is calculated by summing each of these cardinality estimates (step 140). If this Sigma value is the minimum value of Sigma which has been encountered so far, both the value of Sigma and the corresponding join order are stored (step 150). If join orders remain to be examined, the process repeats for the next possible join order (step 160). Otherwise, a join order with the smallest value of Sigma is used to perform the join query (step 170).

Join cardinalities in a multiple-join query can be estimated using a graph representation of the query. Before describing how to use a join graph, however, estimating individual join cardinalities and join selectivities will be described.

Consider the Pk-Fk join R.Pk=S.Fk. The cardinality of such a join is equal to the cardinality of the foreign table (in this example, table S), because each foreign key value matches exactly one record in the primary table. Consider, for example, a database containing a table P of university professors and a table S of the classes they teach. P.profID is a primary key uniquely identifying each professor. S.teacher is an attribute identifying the one professor who teaches a class. S.teacher is therefore a foreign key for P. A join query having the join predicate S.teacher=P.profID, which is of the form S.Fk=P.Pk, will have a cardinality that is equal to |S|, because each class will be taught by exactly one professor.

The join selectivity of a join query is the ratio of the number of matches which result from the join (i.e., the join cardinality) to the product of the cardinalities of the joined tables. Thus, the join selectivity of a Pk-Fk join is given by the following equation, where R is the primary table:

$$\text{join selectivity of Pk-Fk join} = \frac{\text{join cardinality}}{|R|*|S|} = \frac{|S|}{|R|*|S|} = \frac{1.0}{|R|} \qquad \text{(Equation 1)}$$

To estimate the cardinality and selectivity of a Fk-Fk join, consider the following SQL query involving an Fk-Fk join:

SELECT * FROM S, T [Example 1]

WHERE S.Fk=T.Fk

In this example, R.Pk is the underlying primary key for both S.Fk and T.Fk. If the values of the keys used in such a query are substantially uniformly distributed in their tables, and the primary key values are substantially all found among the foreign keys, then for each distinct primary key value, $|S|/|R|$ is a good estimate of the number of occurrences of the value in S.Fk, and $|T|/|R|$ is a good estimate of the number of occurrences of the value in T.Fk. Therefore, one may estimate the join cardinality of the S.Fk =T.Fk join as:

$$\text{join cardinality of Fk-Fk join} = \frac{|S|}{|R|} * \frac{|T|}{|R|} * |R| = \frac{|S|*|T|}{|R|} \qquad \text{(Equation 2)}$$

From the definition of join selectivity and the assumptions stated earlier, one may estimate the join selectivity of an Fk-Fk join as:

$$\text{join selectivity of Fk-Fk join} = \frac{|S|*|T|}{|R|} * \frac{1}{|S|*|T|} = \frac{1}{|R|} \qquad \text{(Equation 3)}$$

Notice that in both the Pk-Fk join and the Fk-Fk join, the estimated join selectivity is equal to 1/|R|, where |R| is the cardinality of the primary key table.

Figure 3:
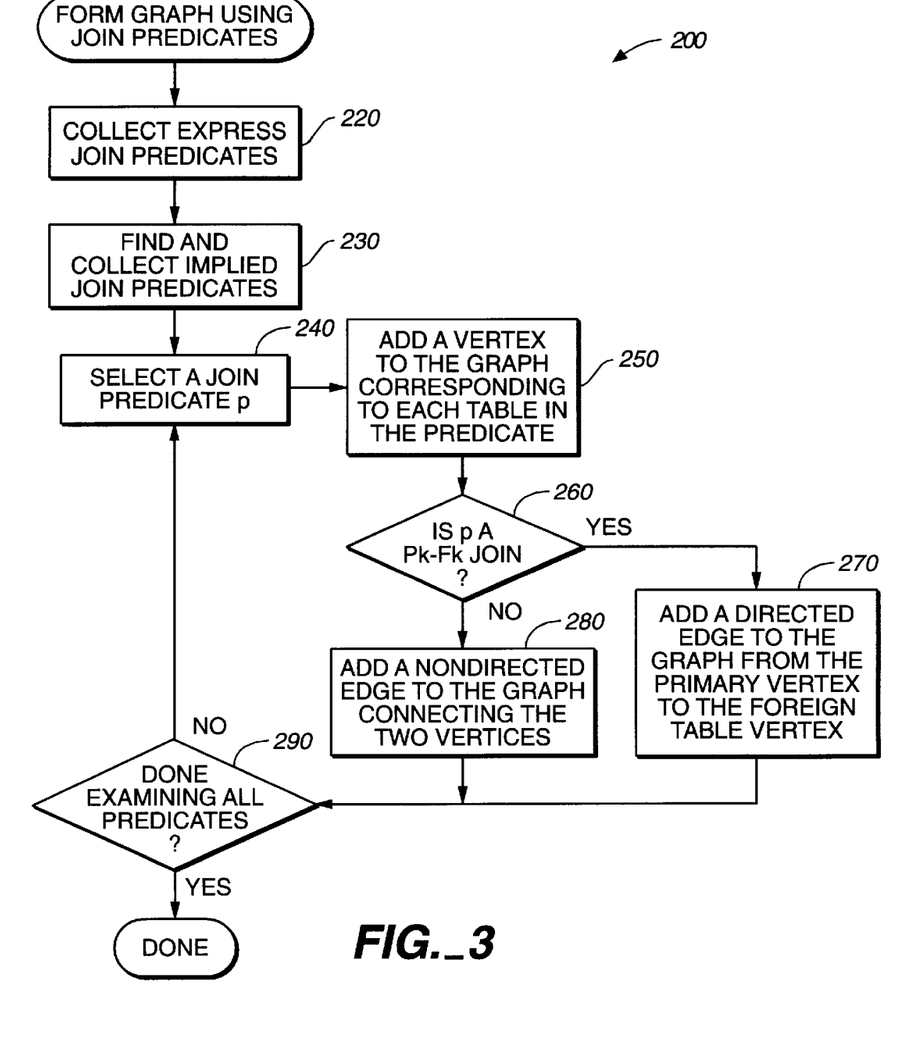
FIG. 3 is a block diagram of a computer-implemented method for creating a graph representation of a multiple join query.

As shown in FIG. 3, a computer-implemented process 200 can be used to represent a multiple join query as a join graph G=(V,E), where V is the set of vertices which correspond one-to-one with the tables in the query, and E is a set of edges which correspond one-to-one with the join predicates (express and implied) in the query. To understand the process, consider the following join query:

SELECT * FROM R, S, T  [Example 2]

WHERE R.Pk=S.Fk

AND R.Pk=T.Fk

To form a join graph representing this join, the first step is to collect all express join predicates (step 220). In Example 2, there are two such predicates: R.Pk=S.Fk and R.Pk =T.Fk. The next step is to collect all join predicates which are implied (step 230). In Example 2, R.Pk=S.Fk and R.Pk=T.Fk imply that S.Fk=T.Fk.

Figure 4:
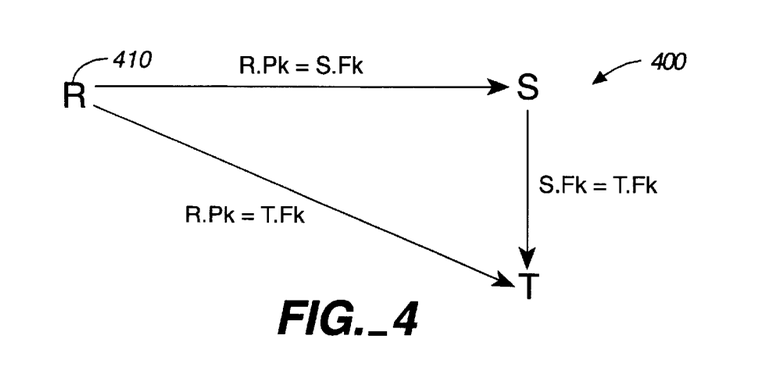
FIG. 4 is a diagram of a join graph.

Next, a pair of vertices and an edge connecting them are added to the graph for each predicate which has been collected (steps 240–290). If a predicate is Pk-Fk, the corresponding edge is directed from the primary table towards the foreign table (step 270). If a predicate is Fk-Fk or any other type of join, the corresponding edge is not directed (step 280). The join graph corresponding to the join query in Example 2 is shown in FIG. 4.

The cardinality of a join query in which the joining columns are independent can be estimated by multiplying: (1) the product of the selectivities of the component joins, (2) the product of the cardinalities of the individual tables in the join, and (3) the product of the selectivities of the individual selections on the tables in the join, if any. Independence of the joining columns is an assumption which is made by all conventional optimizers. The selectivities of component joins of the form P.Pk=S.Fk and S.Fk=T.Fk may be estimated using the methods described above. A database system query optimizer may use whatever other method it has available for computing or estimating the selectivity of other kinds of joins.

Applying this formula to the join graph 400 (FIG. 4), the query cardinality is computed to be:

$$\frac{1.0}{|R|} * \frac{1.0}{|R|} * \frac{1.0}{|R|} * |R| * |S| * |T| = \frac{|S| * |T|}{|R| * |R|}$$

Although conventional join order optimizers do come to this result, a better estimate has been found, namely:

$$\frac{|S| * |T|}{|R|} = N$$

This can be confirmed by noticing that N tuples result if tables S and T are joined first. Since S.Fk=T.Fk in every row of (S, T), every such tuple will join with exactly one tuple of R and hence no additional tuples will result.

Figure 5:
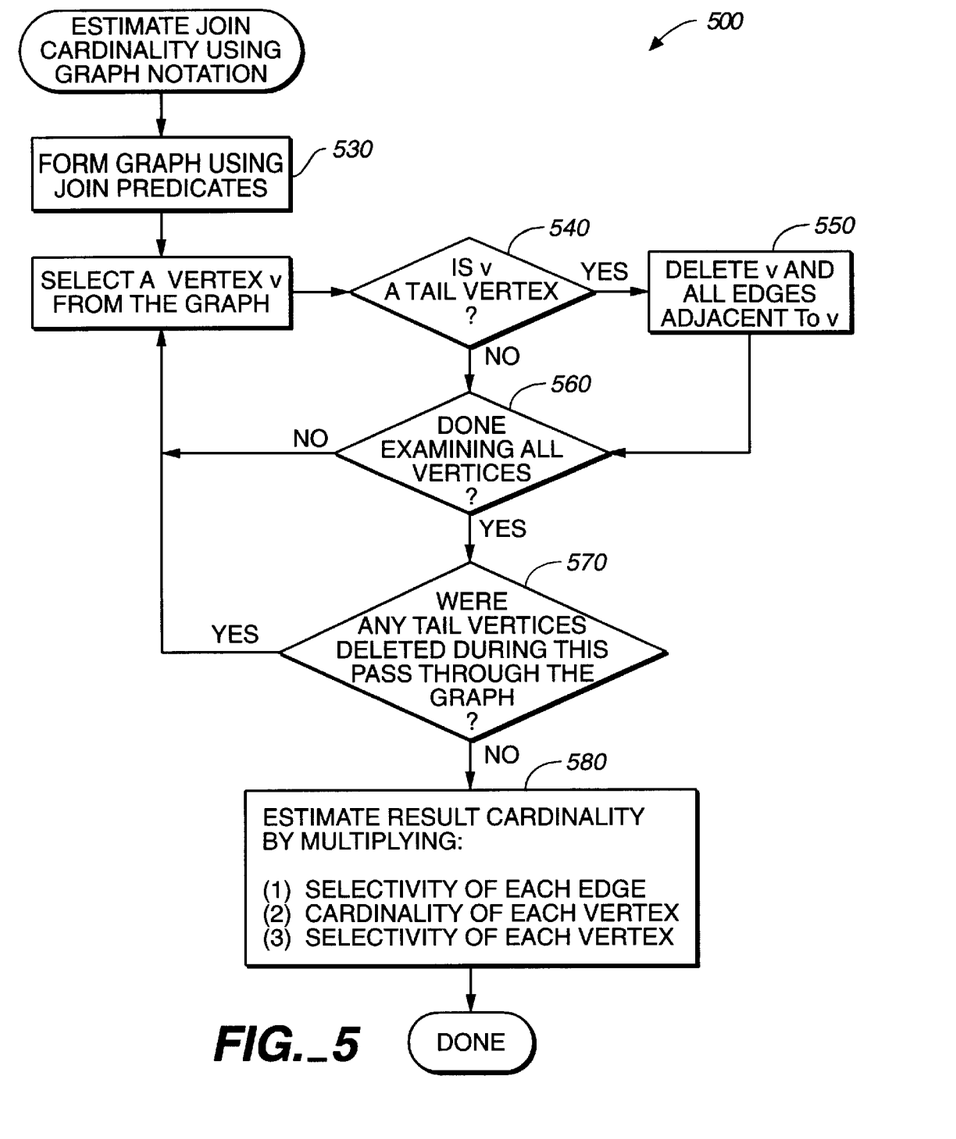
FIG. 5 is a block diagram of a computer-implemented process for estimating the join cardinality of a multiple join query by using a graph representation of the join query.

As shown in FIG. 5, a computer-implemented process 500 for estimating the cardinality of a multiple join using the join graph representation exploits this insight and arrives at the correct result by modifying the graph in the estimation procedure.

First, a graph representation of the join query is formed, for example, by using the procedure 200 (FIG. 3). Next, all tail vertices are eliminated from the graph (steps 530–570). A tail vertex is a vertex to which no other vertices in the graph point. For example, in FIG. 4, vertex R 410 is a tail vertex.

To eliminate tail vertices, the procedure 500 examines each vertex in the graph (step 540). If the vertex is a tail vertex, it and all edges adjacent to it are deleted (step 550). If any tail vertices are deleted during this pass through the graph, another pass is then made (step 570), since eliminating a tail vertex may create another tail vertex.

Once all tail vertices have been eliminated, the join cardinality of the original join can be estimated using the graph that remains, by multiplying: (1) the selectivity of the join represented by each edge, (2) the cardinality of the table represented by each vertex, and (3) the individual selectivity of the table represented by each vertex (step 580). As noted above, this estimate assumes that the joining columns are independent.

The effect of eliminating tail vertices is illustrated in the processing of the following query:

SELECT * FROM R, S, T  [Example 3]

WHERE R.Pk=S.Fk

AND S.Pk=T.Fk

The cardinality of the result is |T|. Joining R and S matches all the rows of S, and then joining S and T matches all the rows of T, the cardinality of which result is |T|. The same result is obtained by evaluating the graph representation using the method of FIG. 5.

Figure 6:
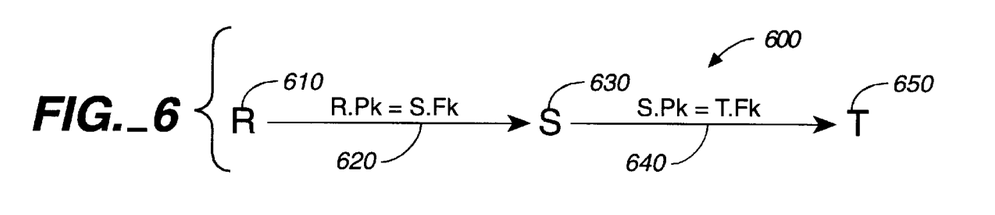
FIG. 6 is a diagram of a join graph.

The join graph 600 in FIG. 6 represents the query in Example 3. The edges 620, 640 are labeled by the respective join predicates. Vertex R 610 is a tail vertex. When vertex R 610 and the edge 620 adjacent to it are removed, what is left is a single edge 640 connecting vertex S 630 and vertex T 650. Vertex S 630 is now a tail vertex, so vertex S 630 and the edge 640 adjacent to it are removed, leaving only vertex T 650. The cardinality of the join result is therefore |T|.

The present invention has been described in terms of an embodiment. The invention, however, is not limited to the embodiment depicted and described. For example, the invention is described in terms of a software implementation; however, the invention may be implemented in software or hardware or firmware, or a combination of the three. The scope of the invention is defined by the claims.

What is claimed is:

1. A computer-implemented method for selecting a join order, the method comprising:

computing a value of a Sigma metric for each possible join order for a query with two or more foreign key—foreign key or foreign key—primary key join operations; and selecting a join order having a minimum computed value of the Sigma metric.

2. The method of claim 1, wherein the value of Sigma for a join order is the sum over all joins in the join order of an estimate of the cardinality of each join as it is performed in the join order, where the cardinality of a join is the number of tuples that will result from the join.

3. The method of claim 1, further comprising:

selecting a join order from among the possible join orders;

obtaining an estimate of the cardinality of each component join in the selected join order; and calculating a value for Sigma by summing each of the cardinality estimates.

4. The method of claim 3, wherein obtaining the cardinality of each component join comprises:

estimating the cardinality using a graph representation method.

5. The method of claim 3, wherein obtaining the cardinality of each component join comprises:

retrieving a pre-computed value as the cardinality of one of the component joins.

6. A computer-implemented method for selecting a join order for a query having two or more join operations, comprising:

identifying a component join as a foreign key—foreign key join, the foreign key—foreign key join being a join where a join predicate is in substance S.fk=T.fk, where S and T are tables and both S.fk and T.fk are foreign keys with respect to one primary or alternate key of one primary table R;

estimating a cardinality of the foreign key—foreign key join as $$\frac{|S| \cdot |T|}{|R|},$$

where |R|, denotes the cardinality of table R; and
using the cardinality to select the join order.

7. A computer-implemented method for selecting a join order for a query having two or more join operations, comprising:

identifying a component join as a foreign key—foreign key join, the foreign key—foreign key join being a join where a join predicate is in substance S.fk=T.fk, where S and T are tables and both S.fk and T.fk are foreign keys with respect to one primary or alternate key of one primary table R;

estimating a join selectivity of the foreign key—foreign key join as $$\frac{1}{|R|},$$

where |R| denotes the cardinality of table R; and
using the join selectivity to determine the join order.

8. A method of estimating a join selectivity of a foreign key—foreign key join for selecting a join order for a query having two or more join operations, the method comprising:

calculating an estimate of the join selectivity of the foreign key—foreign key join as $$\frac{1}{|R|},$$

where |R| denotes a cardinality of primary table R, wherein the foreign key—foreign key join has a join predicate in substance S.fk=T.fk, both of which are foreign keys with respect to one primary or alternate key of the table R; and using the estimate to select the join order for the query having two or more join operations.

9. A system for selecting a join order, the system comprising:

means for computing a value of a Sigma metric for each of all possible join orders for a query with two or more foreign key—foreign key or foreign key—primary key join operations; and means for selecting a join order having a minimum computed value of the Sigma metric.

10. The system of claim 9, wherein the value of Sigma for a join order is the sum over all joins in the join order of an estimate of the cardinality of each join as it is performed in the join order, where the cardinality of a join is the number of tuples that will result from the join.

11. The system of claim 9, further comprising:

means for selecting a join order from among the possible join orders;

means for obtaining an estimate of the cardinality of each component join in the selected join order; and means for calculating a value for Sigma by summing each of the cardinality estimates.

12. The system of claim 11, wherein the means for obtaining the cardinality of each component join comprise:

means for estimating the cardinality using a graph representation method.

13. The system of claim 11, wherein the means for obtaining the cardinality of each component join comprise:

means for retrieving a pre-computed value as the cardinality of one of the component joins.

14. A system for selecting a join order for a query having two or more join operations, comprising:

means for identifying a component join as a foreign key—foreign key join, the foreign key—foreign key join being a join where a join predicate is in substance S.fk=T.fk, where S and T are tables and both S.fk and T.fk are foreign keys with respect to one primary or alternate key of one primary table R; and means for estimating a cardinality of the foreign key—foreign key join as $$\frac{|S| \cdot |T|}{|R|},$$

where |R| denotes the cardinality of table R.

15. A system for selecting a join order for a query having two or more join operations, comprising:

means for identifying a component join as a foreign key—foreign key join, the foreign key—foreign key join being a join where a join predicate is in substance S.fk=T.fk, where S and T are tables and both S.fk and T.fk are foreign keys with respect to one primary or alternate key of one primary table R; and means for estimating a join selectivity of the foreign key—foreign key join as $$\frac{1}{|R|},$$

where |R| denotes the cardinality of table R.

16. A system for estimating a join selectivity of a foreign key—foreign key join for selecting a join order for a query having two or more join operations, the system comprising:

means for identifying a predicate as a foreign key—foreign key join, wherein the join predicate is in substance S.fk=T.fk, both of which are foreign keys with respect to one primary or alternate key of table R; and means for calculating an estimate of the join selectivity of the foreign key—foreign key join as $$\frac{1}{|R|}$$

for use in selecting a join order for a query having two or more join operations, where |R| denotes the cardinality of table R.

17. A computer-implemented method for estimating a cardinality of a multiple-join query of relational database tables, comprising:

calculating data representing a join graph of the multiple-join query of the relational database tables, the join graph having a set of vertices and a set of edges, the set of vertices corresponding one-to-one with the relational database tables in the multiple-join query, the set of edges corresponding one-to-one with the join predicates expressed and implied in the multiple-join query;

eliminating tail vertices from the join graph to form a reduced graph; and using data representing the reduced join graph to estimate the cardinality of the multiple-join query of the relational database tables to select a join order of the multiple-join query.

18. The method of claim 17, wherein eliminating tail vertices comprises:

examining each vertex in a pass through the in graph, and if a vertex is a tail vertex, deleting the vertex and all edges adjacent to the vertex; and if any tail vertices were deleted during the pass through the join graph, making another pass through the join graph to delete tail vertices.

19. The method of claim 17, wherein estimating the cardinality of the multiple-join query comprises multiplying a selectivity of the join represented by each edge, the cardinality of each relational database table represented by each vertex, and an individual selectivity of the table represented by each vertex.

20. A system for estimating a cardinality of a multiple-join query of relational database tables, comprising:

means for calculating data representing a join graph of the multiple-join query of the relational database tables, the join graph having a set of vertices and a set of edges, the set of vertices corresponding one-to-one with the relational database tables in the multiple-join query, the set of edges corresponding one-to-one with join predicates expressed and implied in the query;

eliminating tail vertices from the join graph to form a reduced graph; and means for using the data representing the reduced join graph to estimate the cardinality of the multiple-join query of the relational database tables to select a join order for the multiple-join query.

21. The system of claim 20, wherein the means for eliminating tail vertices comprises:

means for examining each vertex in the join graph, and if a vertex is a tail vertex, deleting the vertex and all edges adjacent to the vertex.

22. The system of claim 20, wherein the means for estimating the cardinality of the multiple-join query comprises means for multiplying a selectivity of the join represented by each edge, the cardinality of each relational database table represented by each vertex, and an individual selectivity of the table represented by each vertex.

23. An apparatus comprising a computer-readable storage medium tangibly embodying program instructions for selecting a join order, the program instructions including instructions operable for causing a computer to:

compute a value of a Sigma metric for each possible join order for a query with two or more foreign key—foreign key or foreign key—primary key join operations; and select a join order having a minimum computed value of the Sigma.

24. The apparatus of claim 23, wherein the value of Sigma for a join order is the sum over all joins in the join order of an estimate of the cardinality of each join as it is performed in the join order, where the cardinality of a join is the number of tuples that will result from the join.

25. The apparatus of claim 24, the program instructions further comprising instructions to:

obtain an estimate of the cardinality of each component join in the selected join order.

26. An apparatus comprising a computer-readable storage medium tangibly embodying program instructions for selecting a join order for a query having two or more join operations, the program instructions comprising instructions to cause a computer to:

identify a component join as a foreign key—foreign key join, the foreign key—foreign key join being a join where a join predicate is in substance S.fk=T.fk, where S and T are tables and both S.fk and T.fk are foreign keys with respect to one primary or alternate key of one primary table R;

estimate a cardinality of the foreign key—foreign key join as $$\frac{|S| \cdot |T|}{|R|},$$

where |R| denotes the cardinality of table R; and use the cardinality to select the join order.

27. An apparatus comprising a computer-readable storage medium tangibly embodying program instructions for estimating a join selectivity of a foreign key—foreign key join for selecting a join order for a query having two or more join operations, the program instructions including instructions operable for causing a computer to:

identify a predicate as a foreign key—foreign key join, wherein the join predicate is in substance S.fk=T.fk, both of which are foreign keys with respect to one primary or alternate key of table R; and calculate an estimate of the join selectivity of the foreign key—foreign key join as $$\frac{1}{|R|}$$

for use to select the join order for the query having two or more join operations, where |R| denotes the cardinality of table R.

28. An apparatus comprising a computer-readable storage medium tangibly embodying program instructions for estimating a cardinality of a multiple-join query of relational database tables, the program instructions including instructions operable for causing a computer to:

calculate data representing a join graph of the multiple-join query of the relational database tables, the join graph having a set of vertices and a set of edges, the set of vertices corresponding one-to-one with the relational database tables in the multiple-join query, the set of edges corresponding one-to-one with join predicates expressed and implied in the multiple-join query;

eliminate tail vertices from the join graph to form a reduced graph; and use data representing the reduced join graph to estimate the cardinality to select a join order for the multiple-join query of the relational database tables.

29. The apparatus of claim 28, wherein instructions to eliminate tail vertices comprise instructions to:

examine each vertex in a pass through the join graph, and if a vertex is a tail vertex, delete the vertex and all edges adjacent to the vertex; and if any tail vertices were deleted during the pass through the join graph, make another pass through the join graph to delete tail vertices.

30. The apparatus of claim 28, wherein instructions to estimate the cardinality of the multiple-join query instructions to:

multiply a selectivity of the join represented by each edge, the cardinality of each relational database table represented by each vertex, and an individual selectivity of the table represented by each vertex.

* * * * *